United States Patent
Tateyama

(10) Patent No.: US 10,389,890 B2
(45) Date of Patent: Aug. 20, 2019

(54) IMAGE FORMING APPARATUS AND IMAGE FORMING SYSTEM FOR USE IN AN EVACUATION SHELTER

(71) Applicant: KYOCERA Document Solutions Inc., Osaka (JP)

(72) Inventor: Yoshitaka Tateyama, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/939,470

(22) Filed: Mar. 29, 2018

(65) Prior Publication Data

US 2018/0288243 A1  Oct. 4, 2018

(30) Foreign Application Priority Data

Mar. 29, 2017 (JP) ................................. 2017-065190

(51) Int. Cl.
*H04N 1/00* (2006.01)

(52) U.S. Cl.
CPC ..... *H04N 1/00206* (2013.01); *H04N 1/00005* (2013.01)

(58) Field of Classification Search
CPC ........................ H04N 1/00005; H04N 1/00206
See application file for complete search history.

(56) References Cited

U.S. PATENT DOCUMENTS

| | | | |
|---|---|---|---|
| 2013/0332209 A1* | 12/2013 | Sawada ................. | G06Q 10/10 705/7.12 |
| 2016/0249194 A1* | 8/2016 | Miyata .................... | H04W 4/90 |
| 2016/0381537 A1* | 12/2016 | R ............................ | H04W 4/90 455/404.1 |

FOREIGN PATENT DOCUMENTS

JP    2008-092246 A    4/2008

* cited by examiner

*Primary Examiner* — Iriana Cruz
(74) *Attorney, Agent, or Firm* — Studebaker & Brackett PC

(57) ABSTRACT

An image forming apparatus is to be located in an evacuation shelter, and includes a first determining section and a shifting section. The first determining section determines whether or not to shift the image forming apparatus from a state in which a "specific function" of the image forming apparatus is not usable to a state in which the specific function is usable. The shifting section shifts the image forming apparatus to the state in which the specific function is usable by a user without being restricted by a usage right, according to a determination result of the first determining section. The specific function includes at least one function from among an evacuee function that processes evacuee information, a supply function that processes aid supply information, and a search function that searches the evacuee information and the aid supply information.

4 Claims, 11 Drawing Sheets

| | | | |
|---|---|---|---|
| Name | Jiro Suzuki | | — 601 |
| Age | 20 | | — 602 |
| Gender | Male | | — 603 |
| Family | Father | Ichiro Suzuki | 50 |
| | Mother | Hanako Suzuki | 45 |
| | Brother | Saburo Suzuki | 15 |
| Address | Tokyo-to, Minato-ku··· | | — 605 |
| Illnesses | | | — 606 |
| Medication | | | — 607 |
| Allergies | | | — 608 |

600

604 (braces rows Father/Mother/Brother)

FIG. 5

| 1st category | 2nd category | Name | Quantity |
|---|---|---|---|
| Food | Bread | Sweetened buns | 100 |
| | | Plain bread | 10 |
| | | Sandwiches | 50 |
| | | ⋮ | ⋮ |
| | Retort food | ⋮ | ⋮ |
| | Canned food | ⋮ | ⋮ |
| Baby goods | Disposable diapers | Disposable diapers (small size) | 300 |
| | | Disposable diapers (medium size) | 200 |
| | | Disposable diapers (large size) | 150 |
| | ⋮ | ⋮ | ⋮ |

IMAGE FORMING APPARATUS AND IMAGE FORMING SYSTEM FOR USE IN AN EVACUATION SHELTER

INCORPORATION BY REFERENCE

The present application claims priority under 35 U.S.C. § 119 to Japanese Patent Application No. 2017-065190, filed on Mar. 29, 2017. The contents of this application are incorporated herein by reference in their entirety.

BACKGROUND

The present disclosure relates to an image forming apparatus and an image forming system.

An image forming apparatus includes a registration form generation section, an image forming section, and a record information database. The registration form generation section selects an information registration form template and inserts information of registration details in the template to generate an information registration form. Details for registering information related to a disaster are expressed in list format on the information registration form. The image forming section prints the information registration form generated by the registration form generation section. The record information database holds registered information related to the disaster. The registration form generation section reflects registered information held in the record information database on the information registration form.

SUMMARY

An image forming apparatus according to an aspect of the present disclosure is to be located in an evacuation shelter, and includes an image forming section, a first determining section, and a shifting section. The image forming section forms an image on a recording medium. The first determining section determines whether or not to shift the image forming apparatus from a state in which a specific function of the image forming apparatus is not usable to a state in which the specific function is usable. The shifting section shifts the image forming apparatus to the state in which the specific function is usable by a user without being restricted by a usage right, according to a determination result of the first determining section. The specific function includes at least one function from among an evacuee function that processes evacuee information, a supply function that processes aid supply information, and a search function that searches the evacuee information and the aid supply information.

An image forming system according to an aspect of the present disclosure includes a plurality of image forming apparatuses each to be located at evacuation shelters and a server communicatively connected to the image forming apparatuses. Each of the image forming apparatuses includes an image forming section, a first determining section, and a shifting section. The image forming section forms an image on a recording medium. The first determining section determines whether or not to shift the image forming apparatus from a state in which a specific function of the image forming apparatus is not usable to a state in which a specific function is usable. The shifting section shifts the image forming apparatus to the state in which the specific function is usable by a user without being restricted by a usage right, according to a determination result of the first determining section. The specific function includes at least one function from among an evacuee function that processes evacuee information, a supply function that processes aid supply information, and a search function that searches the evacuee information and the aid supply information.

BRIEF DESCRIPTION OF THE DRAWINGS

FIG. 5 is a diagram illustrating an example of personal information.

FIG. 6 is a diagram illustrating an example of supply information.

DETAILED DESCRIPTION

Figure 1:
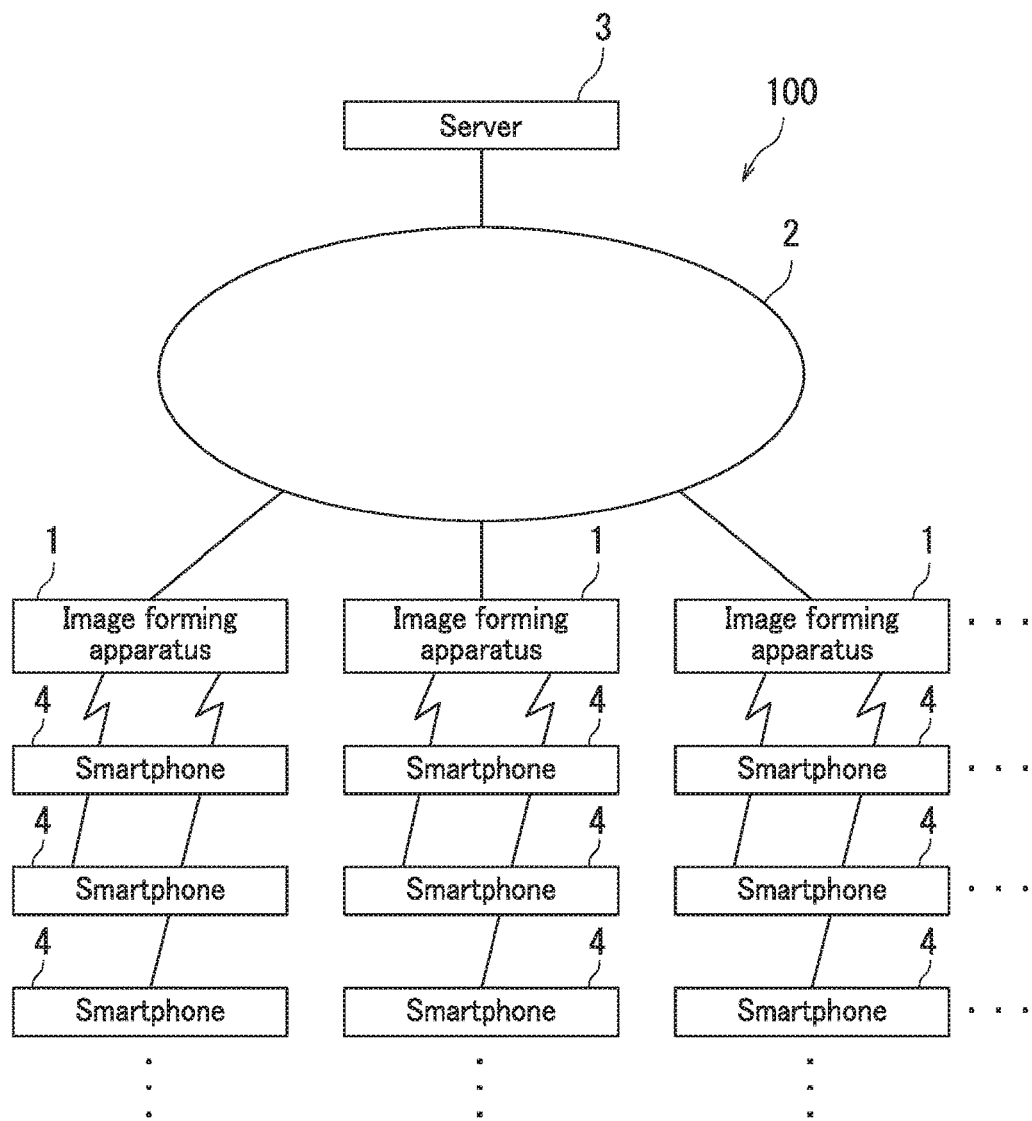
FIG. 1 is a diagram illustrating an example of a configuration of an image forming system according to an embodiment of the present disclosure.

An embodiment of the present disclosure will be described as follows with reference to the drawings (FIGS. 1 to 11). Note that within the drawings, the same or equivalent elements are referred to with the same reference numerals and descriptions thereof are not repeated.

First, a configuration of an image forming system 100 will be described with reference to FIG. 1. FIG. 1 is a diagram illustrating an example of the configuration of the image forming system 100 according to the embodiment of the present disclosure. As illustrated in FIG. 1, the image forming system 100 includes a plurality of image forming apparatuses 1 and a server 3. Each of the image forming apparatuses 1 is communicatively connected to a plurality of smartphones 4.

The image forming apparatuses 1 are each located in evacuation shelters in the event of a disaster. Each of the image forming apparatuses 1 is communicatively connected to a server 3 through an internet 2.

According to a request from one of the image forming apparatuses 1, the server 3 variously inquires to other image forming apparatuses 1. The server 3 relays a response to the image forming apparatus 1 when the response is received from the other image forming apparatuses 1.

Each of the smartphones 4 records personal information. Each of the smartphones 4 transmits the personal information to an image forming apparatus 1. A smartphone 4 is equivalent to an example of a "mobile terminal device".

Figure 2:
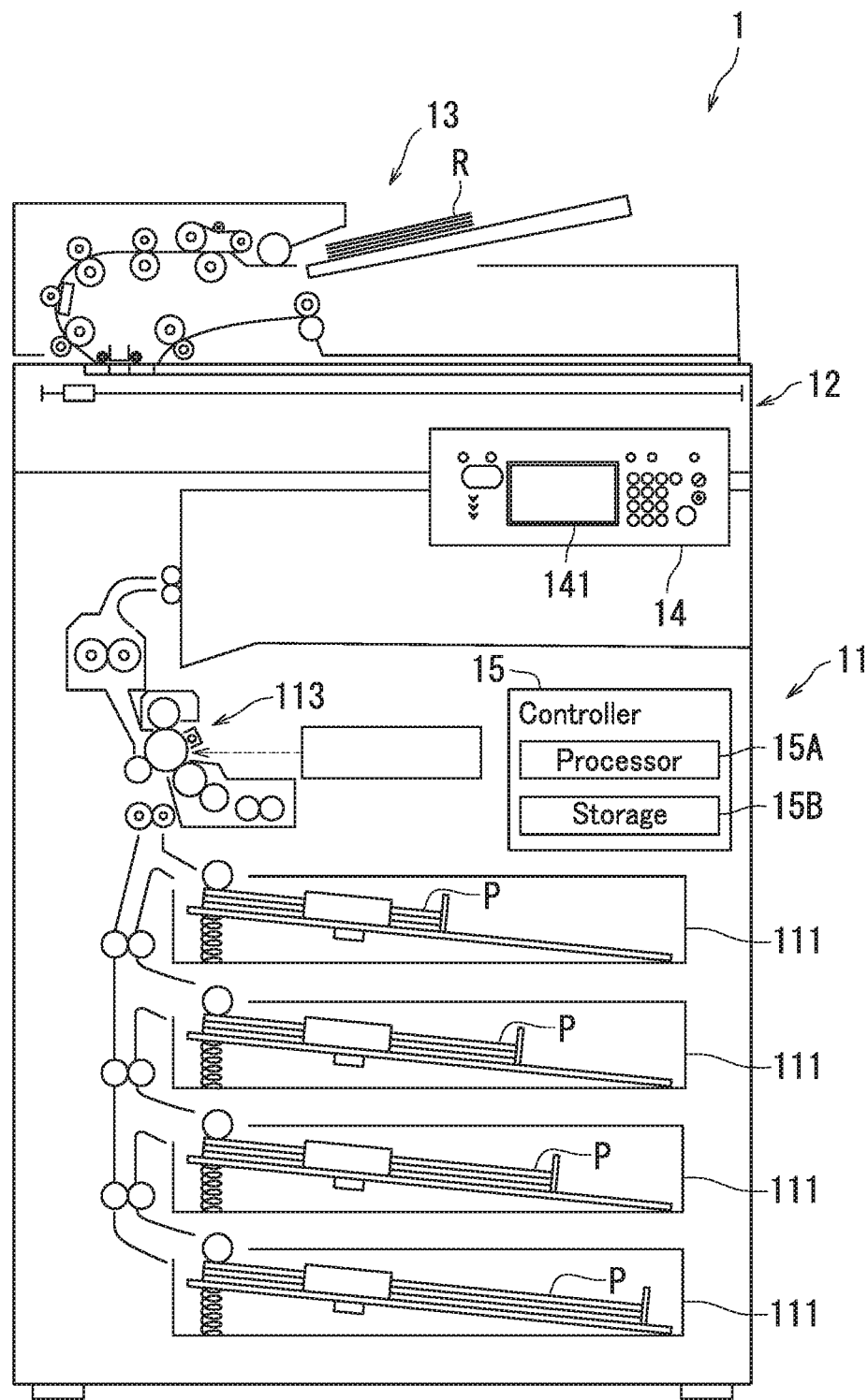
FIG. 2 is a diagram illustrating an example of a configuration of an image forming apparatus according to the embodiment of the present disclosure.

Next, a configuration of the image forming apparatuses 1 will be described with reference to FIG. 2. The image forming apparatuses 1 all have substantially the same configuration. FIG. 2 is a diagram illustrating an example of the configuration of the image forming apparatus 1 according to the embodiment of the present disclosure. The image forming apparatus 1 illustrated in FIG. 2 is a multifunction peripheral. The image forming apparatus 1 includes an image forming unit 11, an image reading unit 12, a document conveyance unit 13, an operation display section 14, and a controller 15.

The image forming unit 11 forms an image on paper P which is an example of a recording medium. The image reading unit 12 reads an image formed on a document R. The document conveyance unit 13 feeds the document R to the image reading unit 12. The operation display section 14 receives an operation from a user. The controller 15 controls the operation of the image forming apparatus 1.

The image forming unit 11 also includes paper feed cassettes 111 and an image forming section 113. The paper P drawn from the paper feed cassettes 111 is conveyed to the image forming section 113. The image forming section 113 forms an image on the paper P. The paper P with the image formed thereon is ejected after the image is fixed to the paper P. The image forming section 113 is a portion of a "forming section".

The operation display section 14 includes a touch panel 141. The touch panel 141 includes a liquid crystal display (LCD) for example, and displays various images. The touch panel 141 further includes a touch sensor and receives an operation from the user. The touch panel 141 is equivalent to an example of a "display".

The controller 15 includes a processor 15A and storage 15B. The processor 15A includes a central processing unit (CPU) for example. The storage 15B includes memory such as semiconductor memory, and may include a hard disk drive (HDD). The storage 15B stores a control program.

Figure 3:
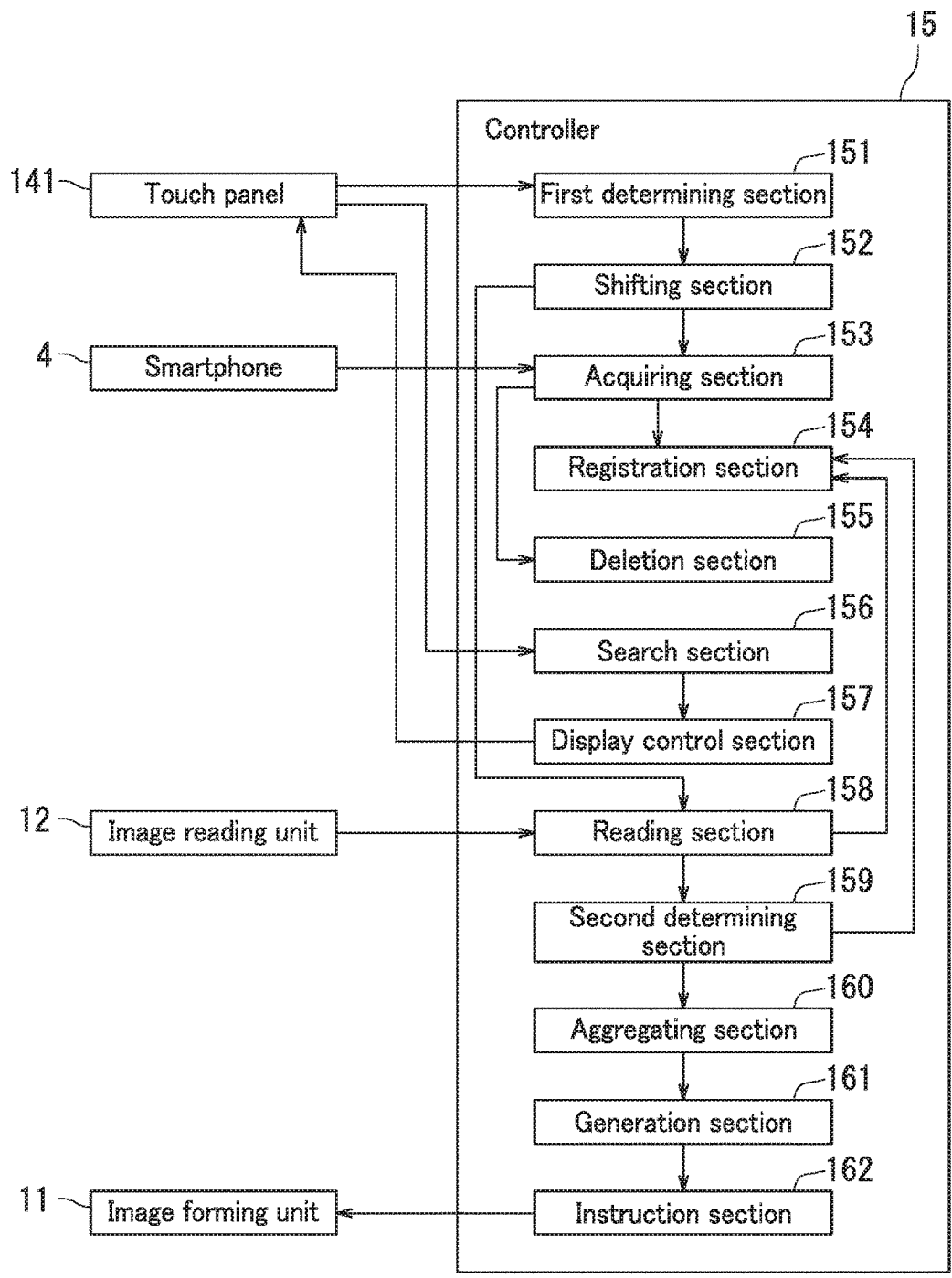
FIG. 3 is a diagram illustrating an example of a configuration of a controller according to the embodiment of the present disclosure.

Next, a configuration of the controller 15 according to the embodiment of the present disclosure will be described with reference to FIGS. 1 to 3. FIG. 3 is a diagram illustrating an example of the configuration of the controller 15 according to the embodiment of the present disclosure. As illustrated in FIG. 3, the controller 15 includes a first determining section 151, a shifting section 152, an acquiring section 153, a registration section 154, a deletion section 155, a search section 156, a display control section 157, a reading section 158, a second determining section 159, an aggregating section 160, a generation section 161, and an instruction section 162. Specifically, the processor 15A functions as the first determining section 151, the shifting section 152, the acquiring section 153, the registration section 154, the deletion section 155, the search section 156, the display control section 157, the reading section 158, the second determining section 159, the aggregating section 160, the generation section 161, and the instruction section 162 by executing the control program.

The first determining section 151 determines whether or not to shift the image forming apparatus 1 from a "normal mode" to a "disaster mode" based on an operation from the user through the touch panel 141. The normal mode indicates a state in which a "specific function" cannot be used. In the normal mode, only a user with a usage right to the image forming apparatus 1 can use the image forming apparatus 1. The user is required to perform user authentication when using the image forming apparatus 1. The disaster mode indicates a state in which the user can use the specific function without being restricted by the usage right.

In the disaster mode, the user is not required to perform user authentication when using the specific function.

The specific function includes an evacuee function, a supply function, and a search function. The evacuee function indicates a function for processing evacuee information. The supply function indicates a function for processing aid supply information. The search function indicates a function for searching the evacuee information and the aid supply information.

The shifting section 152 shifts the image forming apparatus 1 from the normal mode to the disaster mode according to the determination result of the first determining section 151. Specifically, the shifting section 152 shifts the image forming apparatus 1 from the normal mode to the disaster mode when the first determining section 151 has determined to shift the image forming apparatus 1 from the normal mode to the disaster mode.

The acquiring section 153 acquires the personal information stored in the smartphone 4 of an entrant. The entrant is a person who enters the evacuation shelter.

The registration section 154 registers the personal information acquired by the acquiring section 153 in the storage 15B as personal information of evacuees taking refuge in the evacuation shelter.

The deletion section 155 deletes the personal information acquired by the acquiring section 153 from the personal information of the evacuees.

The search section 156 searches the personal information of the evacuees based on an operation from the user through the touch panel 141.

The display control section 157 displays the search result of the search section 156 on the touch panel 141.

The reading section 158 reads name information and quantity information as supply information through the image reading unit 12 when aid supplies are received at the evacuation shelter. The "aid supplies" may be referred to in the following description as simply "supplies". The name information indicates the names of the supplies. The quantity information indicates quantities of the supplies.

The second determining section 159 determines whether or not the name information read by the reading section 158 is registered in the storage 15B.

The aggregating section 160 aggregates the quantities of the supplies for each supply name.

The generation section 161 generates a list indicating an aggregated result of the aggregating section 160.

The instruction section 162 instructs the image forming unit 11 to form an image exhibiting the list on the paper P. The instruction section 162 is equivalent to a portion of the forming section.

In the present embodiment as described above with reference to FIGS. 1 to 3, the image forming apparatus 1 shifts to the disaster mode. In the disaster mode, the user can use the specific function without being restricted by the usage right.

Therefore, the user can process the evacuee information without being restricted by the usage right. The user can also process the aid supply information without being restricted by the usage right. The user can additionally search the evacuee information and the aid supply information without being restricted by the usage right. Accordingly, the burden for an administrator of the image forming apparatus 1 can be reduced.

Figure 4A:
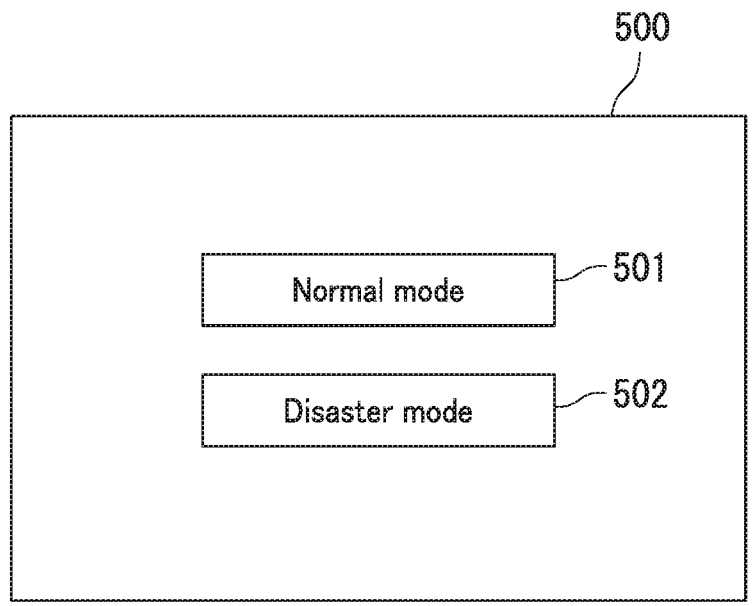
FIG. 4A is a screen diagram illustrating an example of a selection screen for selecting a disaster mode or a normal mode.
Figure 4B:
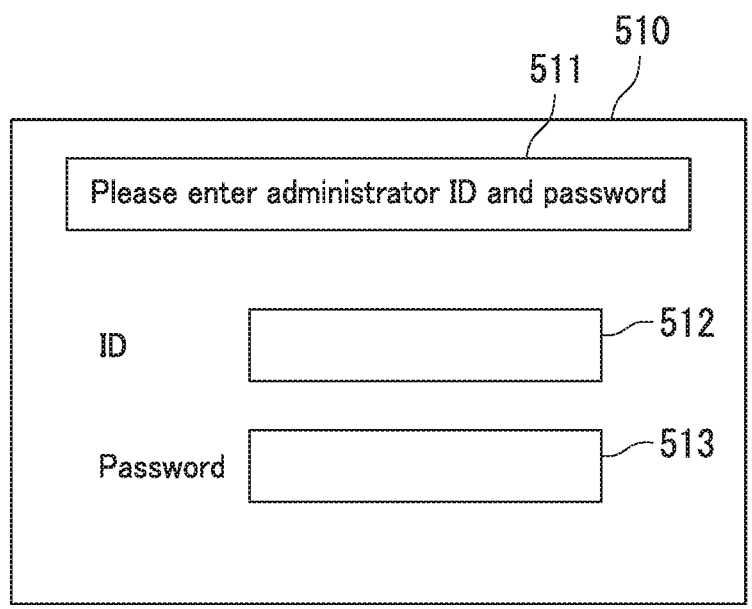
FIG. 4B is a screen diagram illustrating an example of an authentication screen for shifting the image forming apparatus to the disaster mode.

Next, the controller 15 will he further described with reference to FIGS. 1 to 4B. FIG. 4A is a screen diagram illustrating an example of a selection screen 500 for selecting the disaster mode or the normal mode. FIG. 4B is a screen diagram illustrating an example of an authentication screen 510 for shifting to the disaster mode. The first determining section 151 displays the selection screen 500 and the authentication screen 510 on the touch panel 141.

As illustrated in FIG. 4A, a normal mode button 501 and a disaster mode button 502 are displayed in the selection screen 500. The user touches the normal mode button 501 to use the image forming apparatus 1 in the normal mode. The user touches the disaster mode button 502 to use the image forming apparatus 1 in the disaster mode. When the disaster anode button 502 is touched, the first determining section 151 displays the authentication screen 510 on the touch panel 141.

A message display section 511, an identification (ID) entry field 512, and a password entry field 513 are displayed in the authentication screen 510 as illustrated in FIG. 4B. The message: "Please enter administrator ID and password." is displayed in the message display section 511. The user ID of an administrator of the image forming apparatus 1 is to be entered in the ID entry field 512. The password of the administrator of the image forming apparatus 1 is to be entered in the password entry field 513.

When the user ID entered into the ID entry field 512 and the password entered into the password entry field 513 respectively match the user ID and the password of a registered administrator, the shifting section 152 shifts the image forming apparatus 1 to the disaster mode. Specifically, the shifting section 152 shifts the image forming apparatus 1 to a state in which the user can use the specific function being restricted by the usage right. As a result, any user can use the specific function in the image forming apparatus 1.

As described above with reference to FIGS. 1 to 4B, the shifting section 152 shifts the image forming apparatus 1 from the normal mode to the disaster mode when an administrator gives an instruction to shift the image forming apparatus 1 from the normal mode to the disaster mode through the touch panel 141. The instruction from an administrator is necessary to shift the image forming apparatus 1 from the normal mode to the disaster mode. Accordingly, whether or not to shift the image forming apparatus 1 from the normal mode to the disaster mode can be appropriately determined.

Next, the controller 15 will be further described with reference to FIGS. 1 to 3 and 5. FIG. 5 is a diagram illustrating an example of personal information 600. As illustrated in FIG. 5, the personal information 600 includes name information 601, age information 602, gender information 603, family information 604, residence information 605, illness information 606, medication information 607, and allergy information 608.

The name information 601 indicates the name of an individual. The age information 602 indicates the age of the individual. The gender information 603 indicates the gender of the individual. The family information 604 indicates the family structure of the individual. Specifically, the family structure exhibits the name, age, and relationship to the individual of each family member. The residence information 605 indicates the residential address of the individual.

The illness information 606 indicates the names of any illnesses for which the individual is undergoing treatment. The illness information 606 may also include the names of any illnesses the individual has contracted in the past. The medication information 607 indicates the names of any medication the individual is receiving. The allergy information 608 indicates whether the individual is allergic and to what substance.

In the present embodiment, the user stores in advance the personal information 600 on the smartphone 4. The user also generates a two-dimensional barcode (a Quick Response (QR) Code (registered Japanese trademark), for example) that indicates the personal information 600. The two-dimensional barcode is stored in advance on the smartphone 4.

The acquiring section 153 reads the two-dimensional barcode via the image reading unit 12. The two-dimensional barcode indicates the personal information 600 of an entrant or a departee. An entrant indicates a person who enters the evacuation shelter to take refuge. A departee indicates a person who leaves the evacuation shelter. The acquiring section 153 then generates the personal information 600 from the read two-dimensional barcode, thereby acquiring the personal information 600.

The registration section 154 registers the personal information 600 acquired by the acquiring section 153 as personal information of an evacuee who is taking refuge in the shelter. Specifically, the registration section 154 stores the personal information 600 in the storage 15B as personal information of an evacuee.

The deletion section 155 deletes the personal information 600 acquired by the acquiring section 153 from the personal information of the evacuees. Specifically, the deletion section 155 deletes the personal information 600 from the personal information of evacuees stored in the storage 15B.

In the present embodiment as described above with reference to FIGS. 1 to 3 and 5, the acquiring section 153 acquires the personal information 600 stored in the smartphone 4 of an entrant. The registration section 154 then registers the personal information 600 acquired by the acquiring section 153 as personal information of an evacuee who is taking refuge in the evacuation shelter. Therefore, the personal information of an evacuee can be registered in a shorter amount of time than by reading the personal information from a form.

The acquiring section 153 also acquires the personal information 600 stored in the smartphone 4 of a departee. The deletion section 155 then deletes the personal information 600 acquired by the acquiring section 153 from the personal information of the evacuees. Therefore, the personal information of the departee can be easily and accurately deleted from the personal information of the evacuees.

Next, the controller 15 will be further described with reference to FIGS. 1 to 3 and 6. FIG. 6 is a diagram illustrating an example of supply information 700. As illustrated in FIG. 6, the supply information 700 includes first category information 701, second category information 702, name information 703, and quantity information 704. The supply information 700 corresponds to a supply list. The supply information 700 is stored in the storage 15B.

The first category information 701 and the second category information 702 indicate types of supplies. Specifically, the first category information 701 indicates major classifications of the supplies. The second category information 702 indicates intermediate classifications of the supplies. For example, when the name information 703 is "sweetened buns", the first category information 701 indicates "food" and the second category information 702 indicates "bread". Bread, retort food, and canned food are included in supplies indicated as food by the first category information 701. Sweetened buns, plain bread, and sandwiches are included in supplies indicated as bread by the second category information 702. The first category information 701 and the second category information 702 are equivalent to examples of "category information".

The name information 703 indicates the names of the supplies. The names indicate so-called ordinary names. The quantity information 704 indicates the quantities corresponding to the name information 703. For example, the quantity of supplies indicated as sweetened buns by the name information 703 is one hundred. That is, one hundred sweetened buns are kept at the evacuation shelter. For another example, the quantity of supplies indicated as "disposable diapers (small size)" by the name information 703 is three hundred. That is, three hundred small-size disposable diapers are kept at the evacuation shelter.

The reading section 158 reads name information MJ and quantity information NJ as supply information JD via the image reading unit 12 when supplies are received at or dispatched from the evacuation shelter. Specifically, the reading section 158 reads character string information indicating the name information MJ and number information indicating the quantity information NJ via the image reading unit 12. The character string information and number information are recorded on a delivery slip, for example. The reading section 158 performs optical character recognition (OCR) processing on the read character string information and number information, and generates the name information MJ and the quantity information NJ.

The second determining section 159 determines whether or not the name information MJ read by the reading section 158 is registered in the storage 15B. Specifically, the second determining section 159 determines whether or not there is name information 703 that matches the name information MJ read by the reading section 158 within the name information 703 stored in the storage 15B as supply information 700 of the supplies kept at the evacuation shelter.

The registration section 154 registers the name information MJ and the quantity information NJ as supply information 700 of the supplies kept at the evacuation shelter. Specifically, the registration section 154 registers category information CJ (first category information 701 and second category information 702) corresponding to the name information MJ in association with the name information MJ, according to the determination result of the second determining section 159.

The registration section 154 also updates the quantity information 704 stored in the storage 15B as supply information 700 based on the quantity information NJ corresponding to the name information MJ, when the second determining section 159 has determined that the name information MJ is registered in the storage 15B. Specifically, the registration section 154 updates the quantity information 704 by adding the quantity indicated by the quantity information NJ corresponding to the name information MJ to the quantity indicated by the quantity information 704 corresponding to the name information 703 that is the same as the name information MJ, when the evacuation shelter receives supplies. The registration section 154 also updates the quantity information 704 by subtracting the quantity indicated by the quantity information NJ corresponding to the name information MJ from the quantity indicated by the quantity information 704 corresponding to the name information 703 that is the same as the name information MJ, when supplies are dispatched from the evacuation shelter.

The registration section 154 also adds the name information MJ to the supply information 700 when supplies are received at the evacuation shelter and the second determining section 159 has determined that the name information MJ read by the reading section 158 is not registered in the storage 15B. Specifically, the registration section 154 adds the name information MJ as name information 703 that has been stored as the supply information 700 based on an operation from the user on the touch panel 141. For example, the registration section 154 registers sweetened buns as the name information 703 when sweetened buns are received but are not included in the name information 703 stored as supply information 700.

The aggregating section 160 aggregates the quantities indicated by the quantity information 704 of the supplies for each name indicated by the name information 703 of the supplies. Specifically, the aggregating section 160 reads the quantities indicated by the quantity information 704 corresponding to the names indicated by the name information 703 stored as the supply information 700 from the storage 15B. The aggregating section 160 also changes different names indicated by the name information 703 to one name when "names indicating substantially the same supplies" are registered for the different names as the supply information 700. The aggregating section 160 then adds the quantity indicated by the quantity information 704 corresponding to the names and updates the quantity information 704. The names indicating substantially the same supplies are "disposable diapers (small size)" and "disposable diapers (small)".

The generation section 161 generates a supply list JL indicating the aggregated result of the aggregating section 160. The supply list JL is equivalent to a "list". Specifically, the generation section 161 generates a table exhibiting the supply information 700 in FIG. 6.

The instruction section 162 instructs the image forming unit 11 to form an image exhibiting the supply list JL on the paper P based on an operation from the user through the touch panel 141. Specifically, the instruction section 162 directs the image forming section 113 to form the image exhibiting the supply list JL on the paper P. The instruction section 162 is equivalent to a portion of a "forming section".

When supplies are received at the evacuation shelter, as described above with reference to FIGS. 1 to 3 and 6, the reading section 158 reads the name information MJ indicating the names of the supplies and the quantity information NJ indicating the quantities of the supplies as supply information JD. The registration section 154 then registers the supply information JD read by the reading section 158 as the supply information 700 of the supplies kept at the evacuation shelter. Therefore, the supplies can be easily received.

The second determining section 159 determines whether or not the name information MJ is registered in the storage 15B. The registration section 154 then registers category information CJ (first category information 701 and second category information 702) corresponding to the name information MJ in association with the name information MJ, according to the determination result of the second determining section 159. Therefore, the category information (first category information 701 and second category information 702) of the supplies can be easily registered.

Furthermore, the aggregating section 160 aggregates the quantities indicated by the quantity information 704 for each name of a supply indicated by the name information 703. The generation section 161 then generates a supply list JL indicating the aggregated result of the aggregating section 160. The instruction section 162 further directs the image forming unit 11 to form an image exhibiting the supply list JL on the paper P. Accordingly, the image exhibiting the supply list JL in which the supply quantities for each supply name are aggregated is formed on the paper P.

Figure 7:
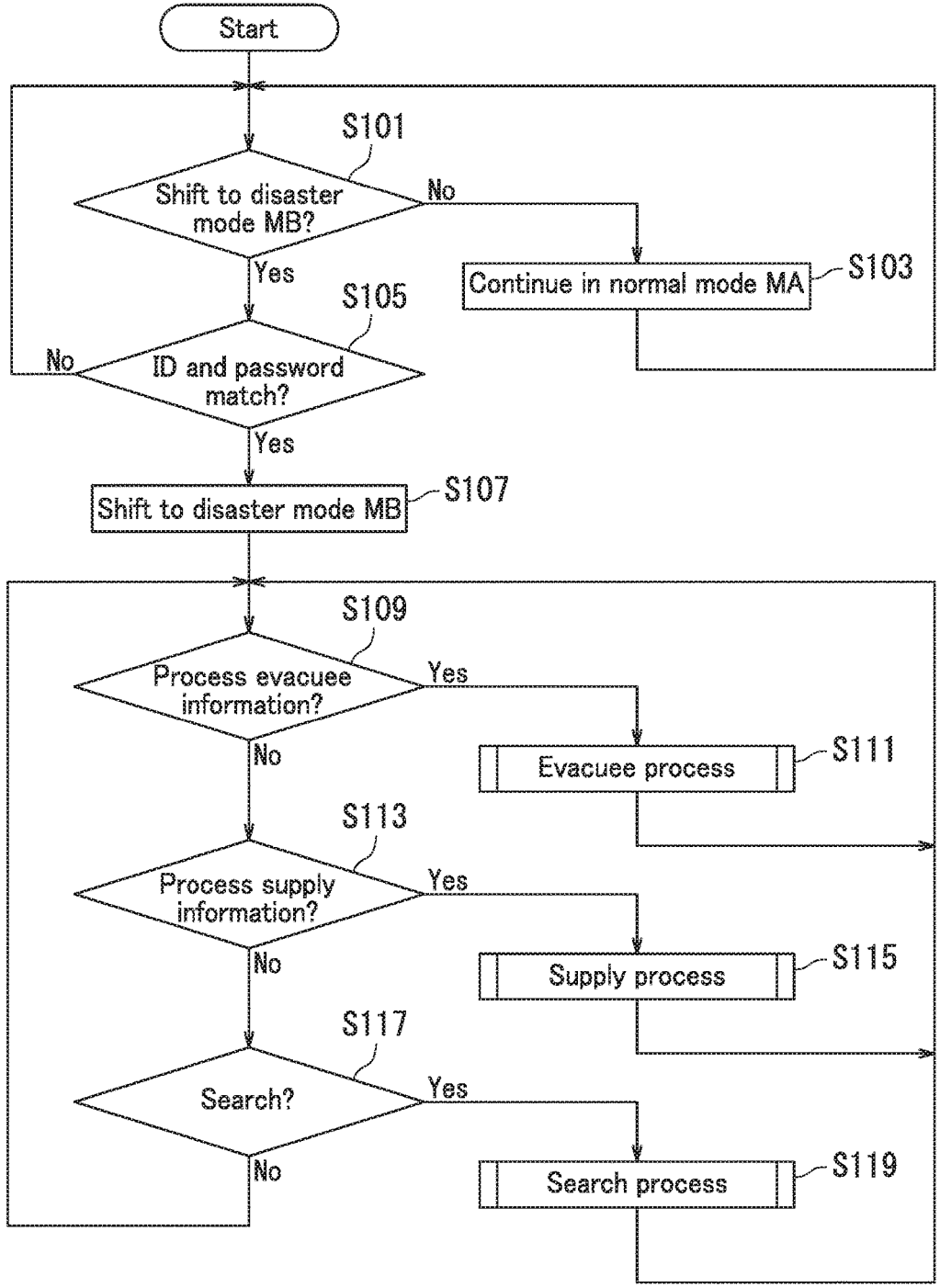
FIG. 7 is a flowchart illustrating a process of the controller.

Next, a process of the controller 15 will be described with reference to FIGS. 1 to 7. FIG. 7 is a flowchart illustrating the process of the controller 15.

In Step S101, the first determining section 151 first determines whether or not to shift the image forming apparatus 1 from a normal mode MA to a disaster mode MB.

The process advances to Step S103 when the first determining section 151 has determined not to shift the image forming apparatus 1 from the normal mode MA to the disaster mode MB (NO in Step S101). In Step S103, the controller 15 then continues the normal mode MA, and the process returns to Step S101. When the first determining section 151 has determined to shift the image forming apparatus 1 from the normal mode MA to the disaster mode MB (YES in Step S101), the process advances to Step S105.

In Step S105, the first determining section 151 then determines whether or not an entered user ID and an entered password match with the registered user ID and password of an administrator.

The process returns to Step S101 when the first determining section 151 has determined that the user ID and password do not match (NO in Step S105). When the first determining section 151 has determined that the user ID and password match (YES in Step S105), the process advances to Step S107.

In Step S107, the shifting section 152 then shifts the image forming apparatus 1 from the normal mode MA to the disaster mode MB, and the process advances to Step S109.

Next, in Step S109, the controller 15 determines whether or not to process evacuee information based on an operation from the user through the touch panel 141.

The process advances to Step S113 when the controller 15 has determined not to process evacuee information (NO in Step S109). When the controller 15 has determined to process evacuee information (YES in Step S109), the process advances to Step S111.

In Step S111, the controller 15 then executes an "evacuee process" and the process returns to Step S109. In the evacuee process, the personal information PD of an evacuee is registered or deleted. The evacuee process corresponds to the evacuee function.

When NO in Step S109, the controller 15 determines whether or not to process supply information based on an operation from the user through the touch panel 141 in Step S113.

The process advances to Step S117 when the controller 15 has determined not to process supply information (NO in Step S113). When the controller 15 has determined to process supply information (YES in Step S113), the process advances to Step S115.

In Step S115, the controller 15 then executes a "supply process" and the process returns to Step S109. In the supply process, the supply information JD of an aid supply is registered or deleted. The supply process corresponds to the supply function.

When NO in Step S113, the controller 15 determines whether or not to perform a search process based on an operation from the user through the touch panel 141 in Step S117.

The process returns to Step S109 when the controller 15 has determined not to perform a search process (NO in Step S117). When the controller 15 has determined to perform a search process (YES in Step S117), the process advances to Step S119.

In Step S119, the controller 15 then executes a "search process" and the process returns to Step S109. In the search process, the personal information PD of the evacuees and the supply information JD are searched. The search process corresponds to the search function.

In the present embodiment as described above with reference to FIGS. 1 to 7, the image forming apparatus 1 can be shifted from the normal mode MA to the disaster mode MB through an administrator performing user authentication. When the image forming apparatus 1 is shifted to the disaster mode MB, the user can also perform the evacuee process, the supply process, and the search process without being restricted by the usage right.

Figure 8:
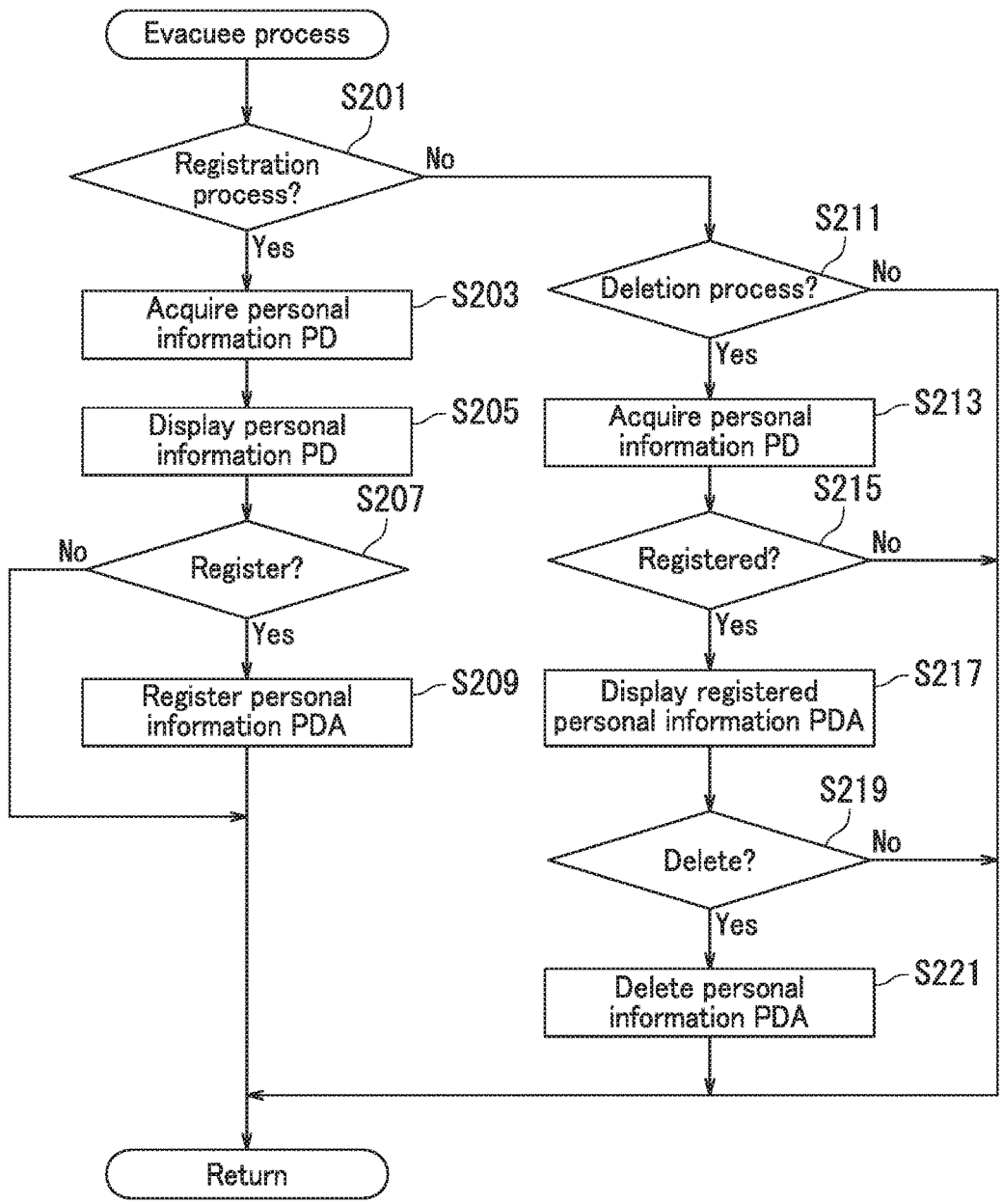
FIG. 8 is a flowchart illustrating an evacuee process of the controller.

Next, the evacuee process of the controller 15 will be described with reference to FIGS. 1 to 8. FIG. 8 is a flowchart illustrating the evacuee process of the controller 15.

In Step S201, the controller 15 first determines whether or not to perform a registration process of the personal information PD of an evacuee based on an operation from the user through the touch panel 141.

The process advances to Step S211 when the controller 15 has determined not to perform the registration process of the personal information PD of the evacuee (NO in Step S201). When the controller 15 has determined to perform the registration process of the personal information PD of the evacuee (YES in Step S201), the process advances to Step S203.

In Step S203, the acquiring section 153 then acquires the personal information PD stored on the smartphone 4 of an entrant. The personal information PD indicates personal information stored on the smartphone 4.

Next, in Step S205, the display control section 157 displays the personal information PD on the touch panel 141.

In Step S207, the registration section 154 then determines whether or not to register the personal information PD as personal information of the evacuee based on an operation from the user through the touch panel 141.

The process returns to Step S109 illustrated in FIG. 7 when it is determined that the personal information PD is not to be registered (NO in Step S207). When it is determined that the personal information PD is to be registered (YES in Step S207), the process advances to Step S209.

In Step S209, the registration section 154 then registers the personal information PD as personal information PDA of the evacuee, and the process returns to Step S109 illustrated in FIG. 7. The personal information PDA is registered as the personal information of the evacuee.

When NO in Step S201, the controller 15 determines whether or not to perform a deletion process of the personal information PDA of the evacuee based on the operation from the user through the touch panel 141 in Step S211.

The process returns to Step S109 illustrated in FIG. 7 when the controller 15 has determined not to perform a deletion process of the personal information PDA (NO in Step S211). When the controller 15 has determined to perform a deletion process of the personal information PDA (YES in Step S211), the process advances to Step S213.

In Step S213, the acquiring section 153 then acquires the personal information PD stored on the smartphone 4 of the entrant.

Next, in Step S215, the deletion section 155 determines whether or not the personal information PD is registered as the personal information PDA of the evacuee.

The process returns to Step S109 illustrated in FIG. 7 when it is determined that the personal information PD is not registered (NO in Step S215). When it is determined that the personal information PD is registered (YES in Step S215), the process advances to Step S217.

In Step S217, the deletion section 155 then displays the registered personal information PDA on the touch panel 141.

Next, in Step S219, the deletion section 155 determines whether or not to delete the personal information PDA corresponding to the personal information PD of the evacuee based on an operation from the user through the touch panel 141.

The process returns to Step S109 illustrated in FIG. 7 when the deletion section 155 has determined not to delete the personal information PDA (NO in Step S219). When the deletion section 155 has determined to delete the personal information PDA (YES in Step S219), the process advances to Step S221.

In Step S221, the deletion section 155 then deletes the personal information PDA corresponding to the personal information PD from the personal information PDA of the evacuee and the process returns to Step S109 illustrated in FIG. 7.

In the present embodiment as described above with reference to FIGS. 1 to 8, the personal information PD of an entrant can be easily registered as the personal information PDA of an evacuee by reading the personal information PD stored on the smartphone 4 of the entrant. The personal information PDA corresponding to the personal information PD of a departee can also be easily deleted from the personal information PDA of the evacuees by reading the personal information PD stored on the smartphone 4 of the departee.

Figure 9:
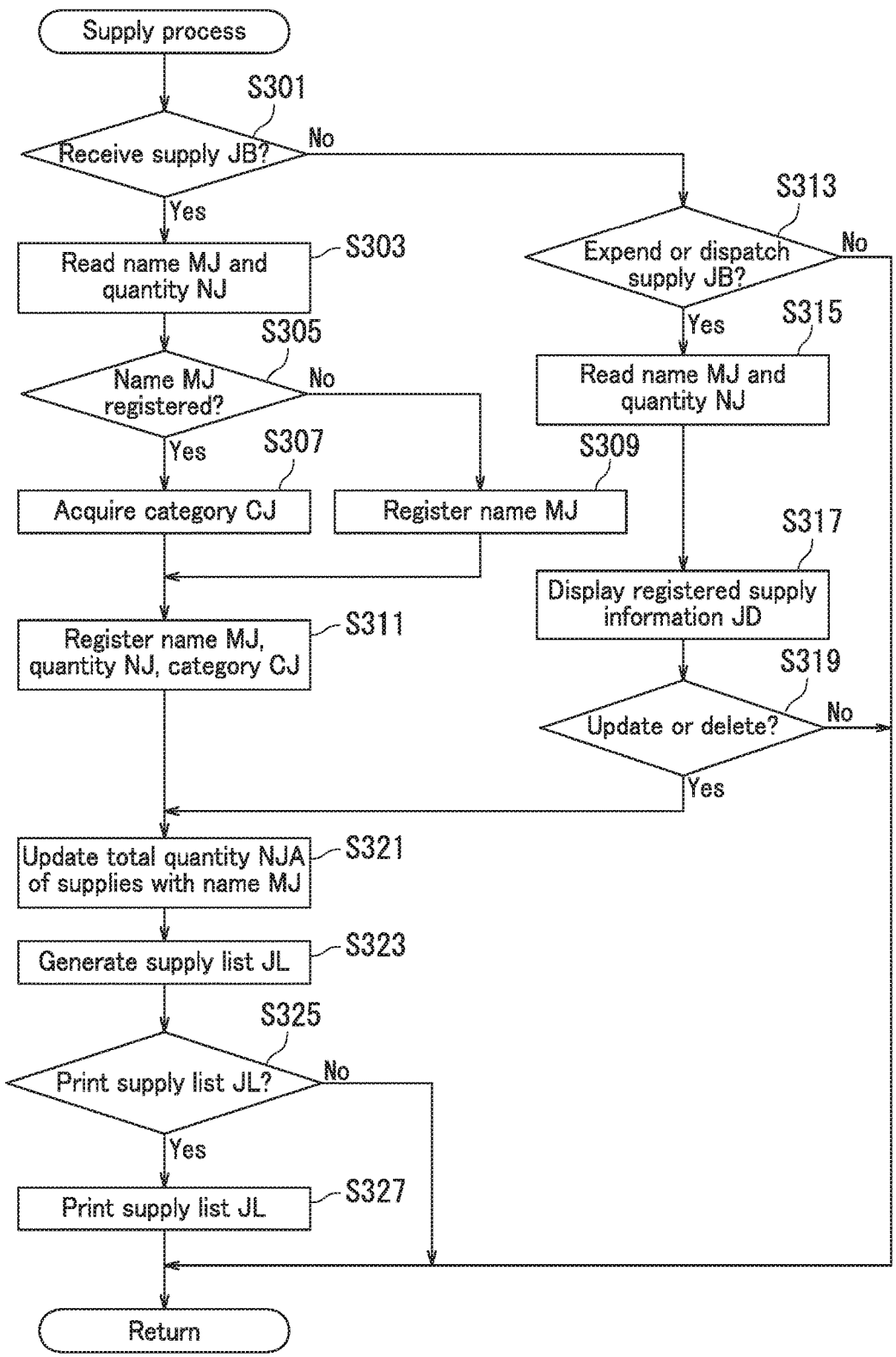
FIG. 9 is a flowchart illustrating a supply process of the controller.

Next, the supply process of the controller 15 will be described with reference to FIGS. 1 to 9. FIG. 9 is a flowchart illustrating the supply process of the controller 15.

In Step S301, the controller 15 first determines whether or not supplies JB are to be received based on an operation from a user through the touch panel 141.

The process advances to Step S313 when the controller 15 has determined that the supplies JB are not to be received (NO in Step S301). When the controller 15 has determined that the supplies JB are to be received (YES in Step S301), the process advances to Step S303.

In Step S303, the reading section 158 then reads the name information MJ and the quantity information NJ recorded on a delivery slip through the image reading unit 12 as supply information JD.

Next, in Step S305, the second determining section 159 determines whether or not the name information MJ is registered in the storage 15B.

The process advances to Step S309 when the second determining section 159 has determined that the name information MJ is not registered (NO in Step S305). When the second determining section 159 has determined that the name information MJ is registered (YES in Step S305), the process advances to Step S307.

In Step S307, the registration section 154 then acquires the category information CJ corresponding to the name information MJ and the process advances to S311.

By contrast, when NO in Step S305, the registration section 154 registers the name information MJ based on an operation from the user on the touch panel 141 in Step S309.

In Step S311, the registration section 154 then registers the name information MJ, the quantity information NJ, and the category information CJ, and the process advances to Step S321.

When NO in Step S301, the controller 15 determines whether or not the supplies JB are to be expended or dispatched based on an operation from the user through the touch panel 141 in Step S313. "Expenditure" of the supplies JB indicates distribution to the evacuees in the evacuation shelter.

The process returns to Step S109 illustrated in FIG. 7 when the controller 15 has determined that the supplies JB are not to be expended or dispatched (NO in Step S311). When the controller 15 has determined that the supplies JB are to be expended or dispatched (YES in Step S313), the process advances to Step S315.

In Step S315, the reading section 158 then reads the name information MJ and the quantity information NJ recorded on a delivery slip through the image reading unit 12.

Next, in Step S317, the registration section 154 displays the supply information JD corresponding to the name information MJ on the touch panel 141.

In Step S319, the registration section 154 then determines whether or not to update or delete the supply information JD corresponding to the name information MJ and the quantity information NJ according to an operation from the user through the touch panel 141.

The process returns to Step S109 illustrated in FIG. 7 when the registration section 154 has determined not to update or delete the supply information JD corresponding to the name information MJ and the quantity information NJ (NO in S319). When the registration section 154 has determined to update or delete the supply information JD corresponding to the name information MJ and the quantity information NJ (YES in Step S319), the process advances to Step S321.

Next, in Step S321, the aggregating section 160 updates aggregated quantity information NJA of supplies corresponding to the name information MJ kept at the evacuation shelter. Specifically, the aggregated quantity information NJA only increases by the quantity indicated by the quantity information NJ when supplies corresponding to the name information MJ are received. Similarly, the aggregated quantity information NJA only decreases by the quantity indicated by the quantity information NJ when supplies corresponding to the name information MJ are expended or dispatched.

In Step S323, the generation section 161 then generates the supply list JL.

Next, in Step S325, the instruction section 162 determines whether or not to print the supply list JL based on an operation from the user through the touch panel 141.

The process returns to Step S109 illustrated in FIG. 7 when the instruction section 162 has determined not to print the supply list JL (NO in Step S325). When the instruction section 162 has determined to print the supply list JL (YES in Step S325), the process advances to Step S327.

In Step S327, the instruction section 62 then prints the supply list JL through the image forming unit 11 and the process returns to Step S109 illustrated in FIG. 7.

In the present embodiment as described above with reference to FIGS. 1 to 9, the supply information JD can be easily updated when supplies are received at or dispatched from the evacuation shelter because the reading section 158 reads the name information MJ and the quantity information NJ. The aggregating section 160 also aggregates the quantities of supplies indicated by the quantity information 704 for each supply name indicated by the name information 703. The generation section 161 then generates the supply list JL indicating the aggregated result of the aggregating section 160. Because of this, the supply list JL can be easily generated.

Figure 10:
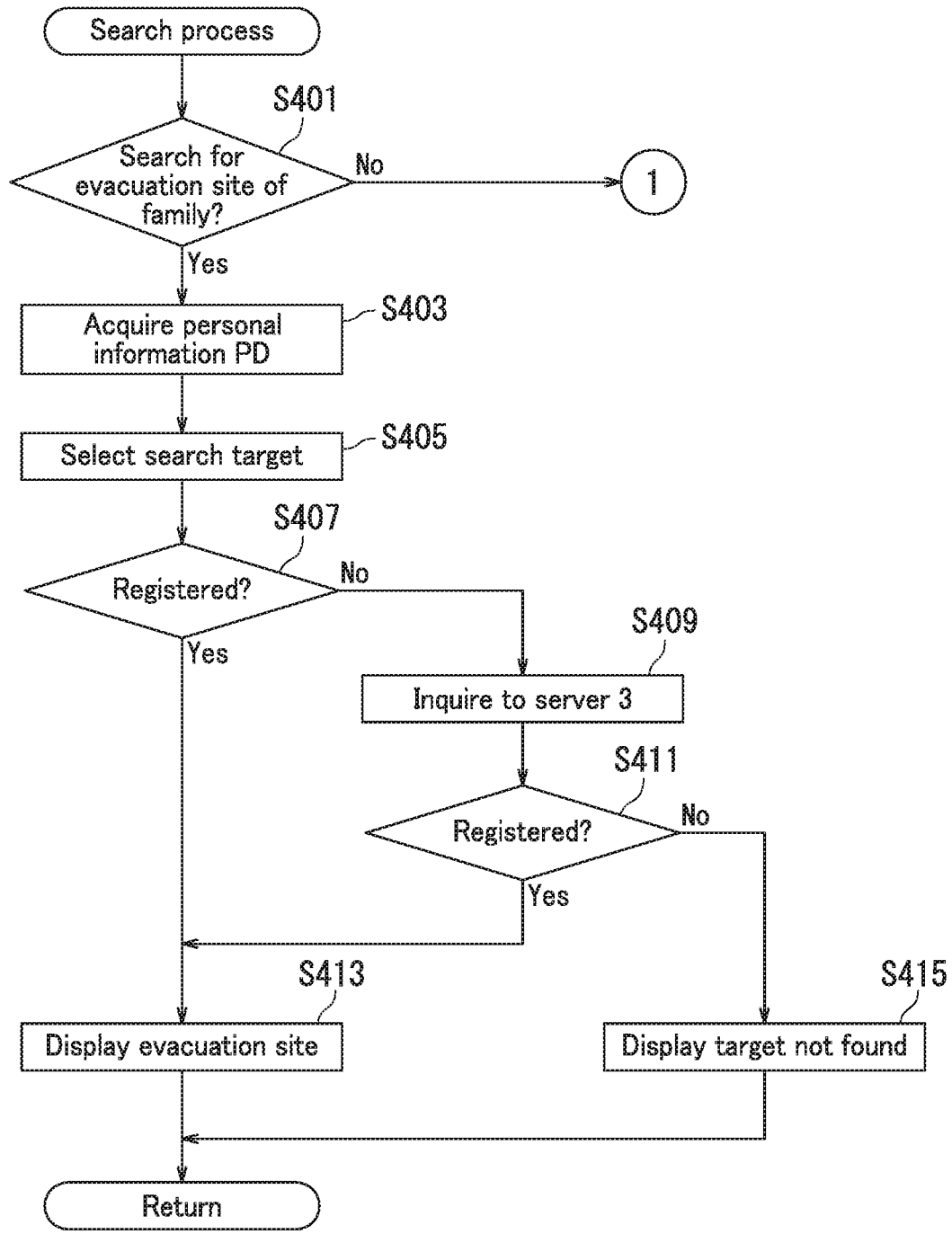
FIG. 10 is a flowchart illustrating a search process of the controller.
Figure 11:
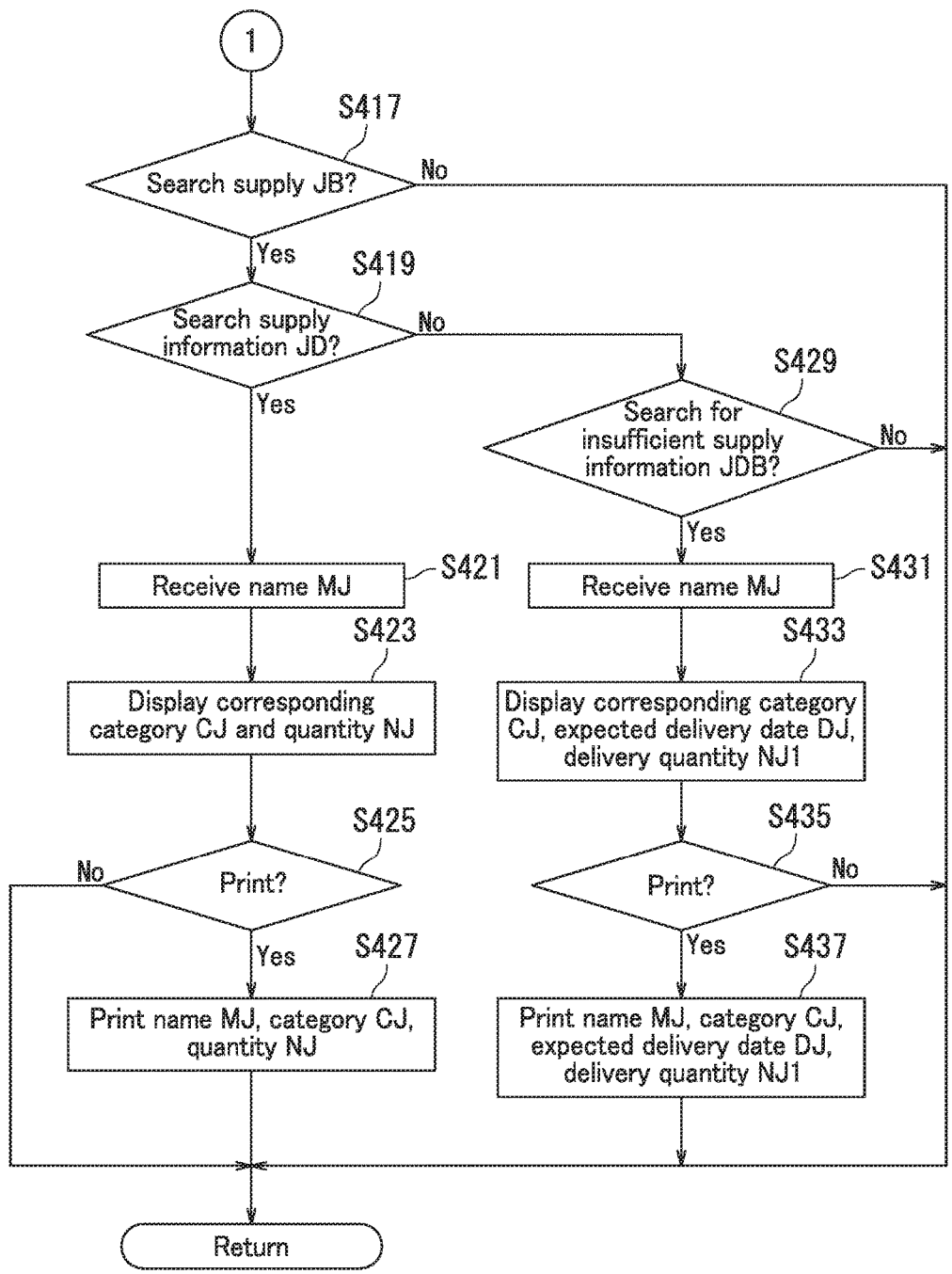
FIG. 11 is another flowchart illustrating the search process of the controller.

Next, the search process of the controller 15 will be described with reference to FIGS. 1 to 11. FIGS. 10 and 11 are flowcharts illustrating the search process of the controller 15.

In Step S401 illustrated in FIG. 10, the search section 156 first determines whether or not to search for an evacuation site of a family based on an operation from a user through the touch panel 141.

The process advances to Step S417 illustrated in FIG. 11 when the search section 156 has determined not to search for the evacuation site of the family (NO in Step S401). When the search section 156 has determined to search for the evacuation site of the family (YES in Step S401), the process advances to Step S403.

In Step S403, the acquiring section 153 then acquires the personal information PD stored in the smartphone 4 of an entrant.

Next, the search section 156 selects a person as a search target based on an operation from the user through the touch panel 141 in Step S405. Specifically, the search section 156 displays the family structure included in the personal information PD on the touch panel 141. The search section 156 then selects the search target from the family members included in the family structure based on an operation from the user through the touch panel 141.

The search section 156 then determines whether or not the search target is registered as an evacuee. Specifically, the search section 156 determines whether or not the name and age of the search target respectively match the name and age included in the personal information PDA of any evacuee.

The process advances to Step S413 when the search section 156 has determined that the search target is registered as an evacuee (YES in Step S407). When the search section 156 has determined that the search target is not registered as an evacuee (NO in Step S407), the process advances to Step S409.

In Step S409, the search section 156 then inquires to the server 3 as to whether or not the search target is registered as an evacuee at any other evacuation shelter.

Next, in Step S411, the search section 156 determines whether or not the search target is registered as an evacuee at any other evacuation shelter based on a response from the server 3.

The process advances to Step S415 when the search section 156 has determined that the search target is not registered as an evacuee at any other evacuation shelter (NO in Step S411). When the search section 156 has determined that the search target is registered as an evacuee at another evacuation shelter (YES in Step S411), the process advances to Step S413.

In Step S413, the display control section 157 then displays the location of the evacuation shelter to which the search target has been evacuated on the touch panel 141, and the process returns to Step S109 illustrated in FIG. 7.

When NO in Step S411, the display control section 157 displays that the search target could not be found on the touch panel 141 in Step S415, and the process returns to Step S109 illustrated in FIG. 7.

When NO in Step S401, the search section 156 determines whether or not to search the supplies JB based on an operation from the user through the touch panel 141 in Step S417 illustrated in FIG. 11.

The process returns to Step S109 illustrated in FIG. 7 when the search section 156 has determined not to search the supplies JB (NO in Step S417). When the search section 156 has determined to search the supplies JB (YES in Step S417), the process advances to Step S419.

In Step S419, the search section 156 then determines whether or not to search the supply information JD based on an operation from the user through the touch panel 141.

The process advances to Step S429 when the search section 156 has determined not to search the supply information JD (NO in Step S419). When the search section 156 has determined to search the supply information JD (YES in Step S419), the process advances to Step S421.

In Step S421, the search section 156 then receives the name information MJ based on an operation from the user through the touch panel 141.

Next, in Step S423, the search section 156 searches the supply information JD for the category information CJ and the quantity information NJ corresponding to the name information MJ. The display control section 157 then displays the category information CJ and the quantity information NJ corresponding to the name information MJ on the touch panel 141.

In Step S425, the instruction section 162 then determines whether to print based on an operation from the user through the touch panel 141.

The process returns to Step S109 illustrated in FIG. 7 when the instruction section 162 has determined not to print (NO in Step S425). When the instruction section 162 has determined to print (YES in Step S425), the process advances to Step S427.

In Step S427, the instruction section 162 then prints the name, category, and quantity respectively corresponding to the name information MJ, the category information CJ, and the quantity information NJ, and the process returns to Step S109 illustrated in FIG. 7.

When NO in Step S419, the search section 156 determines whether or not to search for insufficient supply information JDB based on an operation from the user through the touch panel 141 in Step S429. The insufficient supply information JDB indicates supplies JB that are insufficient in the evacuation shelter among the supplies required by the evacuees. The category information CJ, expected delivery date information DJ, and delivery quantity information NJ1 are registered in association with the name information MJ as insufficient supply information JDB.

For example, the number of infants is determined based on the age of the entrants, and the shortfall of disposable diapers and the like is calculated based on information of the amount in stock. The supplies JB of disposable diapers that are insufficient in the evacuation shelter are then registered as insufficient supply information JDB. For another example, a shortfall of food may be registered as insufficient supply information JDB based on information such as the allergy information of the entrants.

The process returns to Step S109 illustrated in FIG. 7 when it is determined that the insufficient supply information JDB is not to be searched (NO in Step S429). When it is determined that the insufficient supply information JDB is to be searched (YES in Step S429), the process advances to Step S431.

In Step S431, the search section 156 then receives the name information MJ based on an operation from the user through the touch panel 141.

Next, in Step S433, the search section 156 searches for the category information CJ, the expected delivery date information DJ, and the delivery quantity information NE corresponding to the name information MJ from the insufficient supply information JDB. The display control section 157 then displays the category information CJ, the expected delivery date information DJ, and the delivery quantity information NJ1 corresponding to the name information MJ on the touch panel 141.

In Step S435, the instruction section 162 then determines whether or not to print based on an operation from the user through the touch panel 141.

The process returns to Step S109 illustrated in FIG. 7 when the instruction section 162 has determined not to print (NO in Step S435). When the instruction section 162 has determined to print (YES in Step S435), the process advances to Step S437.

In Step S437, the instruction section 162 then prints the name, category, expected delivery date, and delivery quantity respectively corresponding to the name information MJ, the category information CJ, the expected delivery date information DJ, and the delivery quantity information NJ1, and the process returns to Step S109 illustrated in FIG. 7.

In the present embodiment as described above with reference to FIGS. 1 to 11, the search section 156 searches for the personal information PDA of an evacuee. The display control section 157 then displays the search result of the search section 156 on the touch panel 141. Therefore, the user can easily confirm the personal information PDA of the evacuee.

For example, the search section 156 searches for an evacuation site of the family of an evacuee. The display control section 157 then displays the search result of the search section 156 on the touch panel 141. Therefore, the user can easily confirm the evacuation site of the family of the evacuee.

The search section 156 also searches the supply information JD including the name information MJ and the quantity information NJ of the supplies JB kept in the evacuation shelter. The display control section 157 then displays the search results of the search section 156 on the touch panel 141. Therefore, the user can easily confirm the supply information JD of the supplies JB kept in the shelter.

For example, the search section 156 searches for the category information CJ and the quantity information NJ corresponding to the name information MJ. The display control section 157 then displays the search result of the search section 156 on the touch panel 141. Therefore, the user can easily confirm the category information CJ and the quantity information NJ corresponding to the name information MJ.

An embodiment of the present disclosure is described above with reference to the drawings. However, the present disclosure is not limited by the above embodiment, and may be implemented in various manners within a scope not departing from the gist thereof (as illustrated below in (1) to (8), for example). The drawings schematically illustrate elements of configuration in order to facilitate understanding, and properties of elements of configuration illustrated in the drawings, such as thicknesses, lengths, and numbers thereof, may differ from actual properties thereof in order to facilitate preparation of the drawings. Furthermore, properties of elements of configuration described in the above embodiment, such as shapes and dimensions, are merely examples and are not intended as specific limitations. The properties may be altered within a scope not substantially deviating from the configuration of the present disclosure.

(1) In the present embodiment as described with reference to FIG. 1, the plurality of image forming apparatuses 1 communicate with the server 3 through the internet 2. However, the present disclosure is not limited hereto. The image forming apparatuses 1 need only be communicatively connected to the server 3. For example, the image forming apparatuses 1 may communicate with the server 3 through a local area network (LAN). For another example, the image forming apparatuses 1 may communicate with the server 3 through a wide area network (WAN).

(2) In the present disclosure as described with reference to FIG. 1, the mobile terminal device is the smartphone 4. However, the present disclosure is not limited hereto. The mobile terminal device need only include a communication function and a display function. For example, the mobile terminal device may be a tablet-type terminal device. For another example, the mobile terminal device may be a mobile phone.

(3) In the present embodiment as described with reference to FIGS. 1 and 2, the image forming apparatus 1 is a multifunction peripheral. However, the present disclosure is not limited hereto. The image forming apparatus 1 need only include the image forming section 113. For example, the image forming apparatus 1 may also be a copier.

(4) In the present embodiment as described with reference to FIGS. 1 to 3, the "specific function" includes the evacuee function, the supply function, and the search function. However, the present disclosure is not limited hereto. The specific function need only include at least one of the evacuee function, the supply function, or the search function. For example, the specific function may include only the evacuee function. For another example, the specific function may further include a function other than the evacuee function, the supply function, and the search function.

(5) In the present embodiment as described with reference to FIGS. 1 to 4B, the administrator is an administrator of the image forming apparatus 1. However, the present disclosure is not limited hereto. The administrator need only be a person with a right to determine whether or not to shift the image forming apparatus 1 from the normal mode to the disaster mode. For example, the administrator may be a person in charge of the evacuation shelter where the image forming apparatus 1 is located.

(6) In the present embodiment as described with reference to FIGS. 1 to 3 and 5, the acquiring section 153 reads a two-dimensional barcode indicating the personal information 600 of an entrant or departee through the image reading unit 12. However, the present disclosure is not limited hereto. The acquiring section 153 need only acquire the personal information 600 stored in the smartphone 4. For example, the acquiring section 153 may acquire the personal information 600 by communicating with the smartphone 4. For another example, the entrant or departee may print the two-dimensional barcode indicating the personal information 600 on paper. The acquiring section 153 may then read the two-dimensional barcode printed on the paper through the image reading unit 12.

(7) In the present embodiment as described above with reference to FIGS. 1 to 3 and 6, the reading section 158 reads character string information indicating the name information MJ and number information indicating the quantity information NJ recorded on a delivery slip. However, the present disclosure is not limited hereto. The reading section 158 need only read the name information MJ and the quantity information NJ. For example, the reading section 158 may generate the name information MJ and the quantity information NJ from the names and quantities recorded on a note of a user through the image reading unit 12.

(8) In the present embodiment as described with reference to FIGS. 1 to 3 and 6, the aggregating section 160 aggregates the quantities of supplies indicated by the quantity information 704 for each supply name indicated by the name information 703. However, the present disclosure is not limited hereto. The aggregating section 160 need only aggregate the quantities of the supplies for each type or name of the supplies. For example, the aggregating section 160 may aggregate the quantities of the supplies for each type of the supplies indicated by the second category information 702.

What is claimed is:

1. An image forming apparatus to be located in an evacuation shelter, comprising:
    an image forming section configured to form an image on a recording medium;
    an operation section; and
    a controller; wherein
    the controller includes:
        a first determining section configured to determine whether or not to shift the image forming apparatus from a normal mode that is a state in which a specific function of the image forming apparatus is not usable to a disaster mode that is a state in which the specific function is usable; and
        a shifting section configured to shift the image forming apparatus to the disaster mode when the first determining section has determined to shift from the normal mode to the disaster mode through an administrator performing user authentication,
    the normal mode is a mode in which only a user with a usage right to the image forming apparatus can use the image forming apparatus,
    the disaster mode is a mode in which the user can use the specific function without being restricted by the usage right,
    the specific function includes an evacuee function that processes evacuee information, a supply function that processes aid supply information, and a search function that searches the evacuee information and the aid supply information,
    the controller further includes an acquiring section, a registration section, and a deletion section,
    the controller determines whether or not to process the evacuee information based on an operation from the user through the operation section,
    when the controller has determined to process the evacuee information,
        the acquiring section acquires personal information stored on a mobile terminal device of an entrant that enters the evacuation shelter,
        the registration section registers the personal information acquired by the acquiring section from the mobile terminal device of the entrant as personal information of an evacuee taking refuge at the evacuation shelter,
        the acquiring section acquires personal information stored on a mobile terminal device of a departee that leaves the evacuation shelter,
        the deletion section deletes, from the personal information of the evacuees, the personal information acquired by the acquiring section from the mobile terminal device of the departee, and
        each of the personal information includes personal name information, age information, gender information, and residence information,
    the controller further includes a reading section, a second determining section, and an aggregating section,
    the controller determines whether or not to process the aid supply information based on the operation from the user through the operation section,
    when the controller has determined to process the aid supply information,
        the reading section reads, when one or more supplies are received at the evacuation shelter, name information indicating names of the supplies and quantity information indicating quantities of the supplies as supply information,
        the registration section registers the supply information read by the reading section as the supply information of supplies kept at the evacuation shelter,
        the aggregating section aggregates the quantities of the supplies for each type or name of the supplies,
        the second determining section determines whether or not the name information is registered,
        the registration section registers category information corresponding to the name information in association with the name information when the second determining section has determined that the name information is registered,
        the category information indicates types of the supplies,
        the registration section registers the name information based on the operation from the user through the operation section when the second determining section has determined that the name information is not registered,
        the aggregating section adds a quantity indicated by the quantity information to total quantity information of the supplies kept at the evacuation shelter corresponding to the name information when the supplies corresponding to the name information are received,
        the reading section reads, when one or more of the supplies are expended or dispatched from the evacuation shelter, name information indicating names of the supplies and quantity information indicating quantities of the supplies as the supply information, and
        the aggregating section subtracts the quantity indicated by the quantity information from the total quantity information of the supplies kept at the evacuation shelter corresponding to the name information when the supplies corresponding to the name information are expended or dispatched,
    the controller further includes a search section and a display control section,
    the controller determines whether or not to perform a process of searching the evacuee information and the aid supply information based on the operation from the user through the operation section, and
    when the controller has determined to perform the process of searching the evacuee information and the aid supply information,
        the search section searches the personal information of the evacuees, and
        the display control section displays a search result of the search section on a display,
        the search section
            selects a search target based on the operation from the user through the operation section, and
            inquires, when the search target is not registered as an evacuee, to a server as to whether or not the search target is registered as an evacuee at any other evacuation shelter, and
        when the search target is registered as an evacuee at the any other evacuation shelter, the display control section displays a location of the any other evacuation shelter on the display, the search section performs search of the supply information including the name information and the quantity information of the supplies kept at the evacuation shelter, the display control section displays a result of the search of the search section on the display, the search section searches for insufficient supply information, the insufficient supply information is information indicating supplies that are insufficient in the evacuation shelter among supplies required by the evacuees, and a shortfall of the supplies is calculated based on the personal information of the entrant and registered in the insufficient supply information.

2. The image forming apparatus according to claim 1, wherein the mobile terminal device stores the personal information as a two-dimensional barcode.

3. The image forming apparatus according to claim 1, wherein the controller further includes:
a generation section configured to generate a list indicating an aggregated result of the aggregating section; and
a forming section configured to direct the image forming section to form an image exhibiting the list on the recording medium.

4. An image forming system, comprising:
a plurality of image forming apparatuses each to be located at evacuation shelters; and
a server communicatively connected to the image forming apparatuses, wherein
each of the image forming apparatuses comprises:
an image forming section configured to form an image on a recording medium;
an operation section; and
a controller,
the controller includes:
a first determining section configured to determine whether or not to shift the image forming apparatus from a normal mode that is a state in which a specific function of the image forming apparatus is not usable to a disaster mode that is a state in which the specific function is usable; and
a shifting section configured to shift the image forming apparatus to the disaster mode when the first determining section has determined to shift from the normal mode to the disaster mode through an administrator performing user authentication,
the normal mode is a mode in which only a user with a usage right to the image forming apparatus can use the image forming apparatus,
the disaster mode is a mode in which the user can use the specific function without being restricted by the usage right,
the specific function includes an evacuee function that processes evacuee information, a supply function that processes aid supply information, and a search function that searches the evacuee information and the aid supply information,
the controller further includes an acquiring section, a registration section, and a deletion section,
the controller determines whether or not to process the evacuee information based on an operation from the user through the operation section, when the controller has determined to process the evacuee information,
the acquiring section acquires personal information stored on a mobile terminal device of an entrant that enters the evacuation shelter,
the registration section registers the personal information acquired by the acquiring section from the mobile terminal device of the entrant as personal information of an evacuee taking refuge at the evacuation shelter,
the acquiring section acquires personal information stored on a mobile terminal device of a departee that leaves the evacuation shelter,
the deletion section deletes, from the personal information of the evacuees, the personal information acquired by the acquiring section from the mobile terminal device of the departee, and
each of the personal information includes personal name information, age information, gender information, and residence information,
the controller further includes a reading section, a second determining section, and an aggregating section,
the controller determines whether or not to process the aid supply information based on the operation from the user through the operation section,
when the controller has determined to process the aid supply information,
the reading section reads, when one or more supplies are received at the evacuation shelter, name information indicating names of the supplies and quantity information indicating quantities of the supplies as supply information,
the registration section registers the supply information read by the reading section as the supply information of supplies kept at the evacuation shelter,
the aggregating section aggregates the quantities of the supplies for each type or name of the supplies,
the second determining section determines whether or not the name information is registered,
the registration section registers category information corresponding to the name information in association with the name information when the second determining section has determined that the name information is registered,
the category information indicates types of the supplies,
the registration section registers the name information based on the operation from the user through the operation section when the second determining section has determined that the name information is not registered,
the aggregating section adds a quantity indicated by the quantity information to total quantity information of the supplies kept at the evacuation shelter corresponding to the name information when the supplies corresponding to the name information are received,
the reading section reads, when one or more of the supplies are expended or dispatched from the evacuation shelter, name information indicating names of the supplies and quantity information indicating quantities of the supplies as the supply information, and
the aggregating section subtracts the quantity indicated by the quantity information from the total quantity information of the supplies kept at the evacuation shelter corresponding to the name information when the supplies corresponding to the name information are expended or dispatched, the controller further includes a search section and a display control section the controller determines whether or not to perform a process of searching the evacuee information and the aid supply information based on the operation from the user through the operation section, and when the controller has determined to perform the process of searching the evacuee information and the aid supply information, the search section searches the personal information of the evacuees, and the display control section displays a search result of the search section on a display, the search section selects a search target based on the operation from the user through the operation section, and inquires, when the search target is not registered as an evacuee, to a server as to whether or not the search target is registered as an evacuee at any other evacuation shelter, and when the search target is registered as an evacuee at the any other evacuation shelter, the display control section displays a location of the any other evacuation shelter on the display, the search section performs search of the supply information including the name information and the quantity information of the supplies kept at the evacuation shelter, the display control section displays a result of the search of the search section on the display, the search section searches for insufficient supply information, the insufficient supply information is information indicating supplies that are insufficient in the evacuation shelter among supplies required by the evacuees, and a shortfall of the supplies is calculated based on the personal information of the entrant and registered in the insufficient supply information.

\* \* \* \* \*